May 28, 1929. T. CARROLL ET AL 1,715,277
METHOD OF IMPROVING VISIBILITY IN AIRCRAFT
Filed Oct. 4, 1927
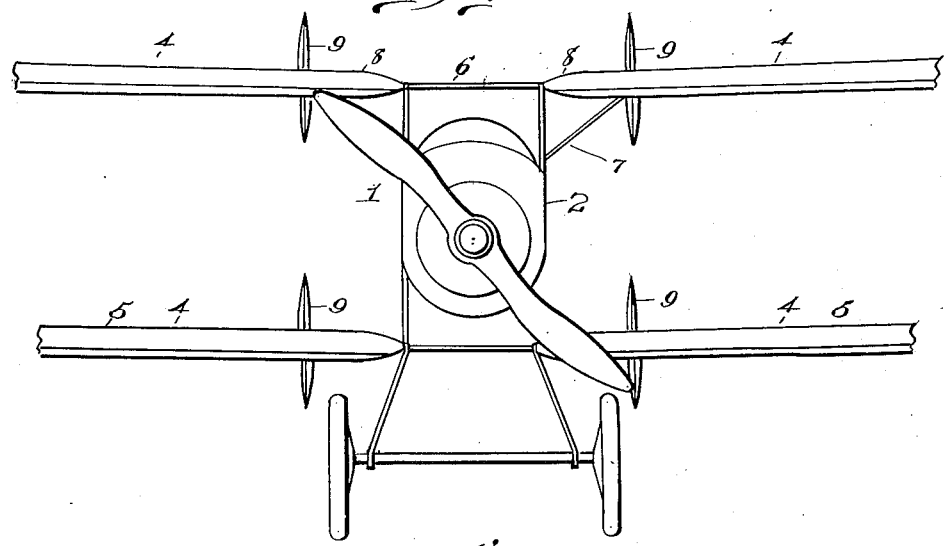
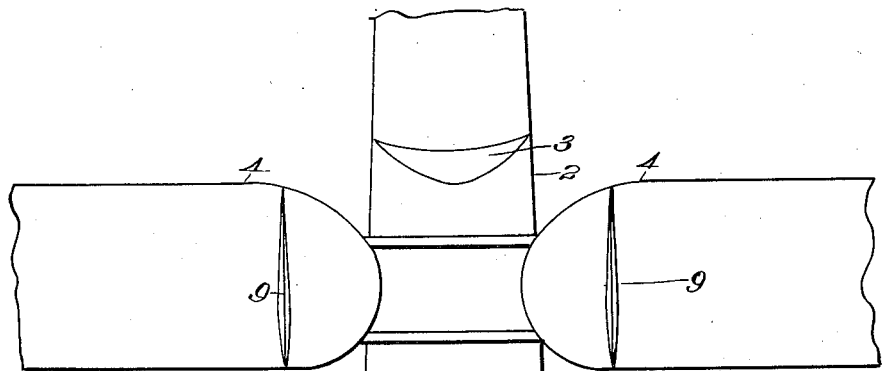
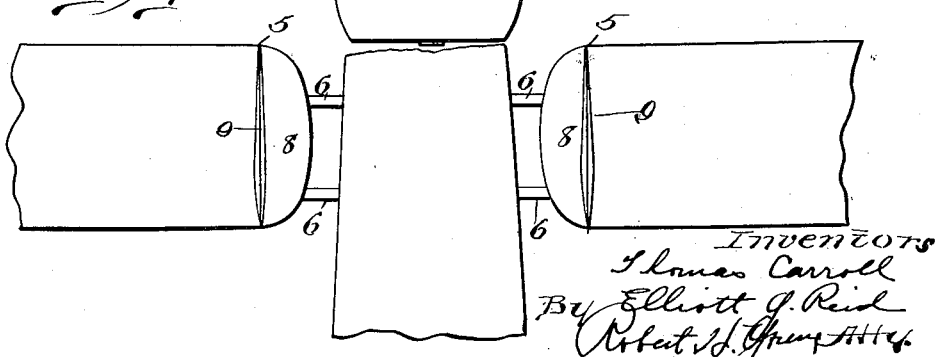

Patented May 28, 1929.

1,715,277

UNITED STATES PATENT OFFICE.

THOMAS CARROLL AND ELLIOTT G. REID, OF HAMPTON, VIRGINIA.

METHOD OF IMPROVING VISIBILITY IN AIRCRAFT.

Application filed October 4, 1927. Serial No. 223,929.

This invention relates to aircraft, but more particularly to the construction and arrangement of the wing or wings of an airplane for the purpose of increasing the field of vision of the pilot. The invention is particularly applicable to military airplanes, but is useful in aircraft generally as an aid to safe and efficient navigation thereof.

In airplanes, particularly of the tractor type in which the pilot cockpit is to the rear of the wings, the center sections of said wings constitute an impediment to forward vision, which offers a very serious disadvantage to a pilot in military combat.

The invention has for its object to correct this deficiency by so constructing the center sections of the wings as to permit clear unobstructed forward vision of the pilot to the end that the military efficiency of the plane is greatly increased.

With this and other objects in view, the invention consists in the construction which provides for the elimination of the center section of the wings as a lifting surface and in the treatment of the roots of the wings.

The invention further consists in the disposition of wing tip shields on the wings adjacent the roots thereof to correct the undesirable aerodynamic influence of the discontinuity of the central lifting surfaces.

Referring to the accompanying drawing which shows the application of this invention to an airplane of otherwise conventional design—

Figure 1 is a front elevation;
Figure 2 is a top plan view showing the upper wing structure; and
Figure 3 is a similar view illustrating the lower wing structure.

Like numerals of reference indicate the same parts throughout the several figures, in which:

1 indicates an airplane of the tractor type which includes the body or fuselage 2, the pilot's cockpit 3 being located to the rear of the upper and lower wings 4 and 5.

6 indicates the wing spars and 7 are struts or members for supporting the upper wings. It will be understood that this invention is in no way limited to any particular or specific construction or design of wing bracing or supporting struts or members, and in that sense the accompanying drawing is merely diagrammatic. The particular or specific construction and design of wing bracing supports, etc. must depend upon the factors of type, size, etc. which must be changed, altered or modified to meet requirements as they are found to exist.

As will appear from the drawing, the center sections of the upper and lower wings 4 and 5 are cut out, and the root portions of said wings are modified to form wing tips 8.

The space or opening between the tips 8 of the lower wings 5 may be greater than the corresponding space or opening between the upper wings 4. However, that detail depends upon conditions, it being only material that these spaces or openings between the tips 8 of the respective wings be sufficient to permit the practical application or accomplishment of the inventive purpose.

9 indicates the wing-tip shields, which are disposed on either the upper or the lower wings or both, and as shown are arranged adjacent the wing tips 8 transversely of the wings and upon the upper or lower surfaces or both. The function of said shields is to improve the aerodynamic value of the cut-out wing sections by flow improvement and the elimination of tip losses.

Having thus fully described the invention, what we claim as new and desire to secure by Letters Patent of the United States is—

1. In an airplane having upper and lower wings and a fuselage substantially intermediate said upper and lower wings, the combination with the fuselage, of the upper wing having the central portion thereof cut out directly over and above the said fuselage, the opposing roots of said upper wing being shaped to form wing-tips, a wing-tip shield on the upper and lower surfaces of said wing adjacent each of the opposed wing-tips and lying transversely of the wing to correct the undesirable aerodynamical influence of the discontinuity of the lifting surfaces of the wing, the section of the said lower wing being cut out immediately adjacent the said fuselage to provide an open space on each side of said fuselage, the opposing roots of said lower wing being shaped to form wing-tips, a wing-tip shield on the upper and lower surfaces of said lower wing adjacent each of the opposed wing-tips and lying transversely of the wing to correct the undesirable aerodynamical influence of the discontinuity of the lifting surfaces of the wing.

2. In an airplane having upper and lower wings and a fuselage substantially intermediate said upper and lower wings, the combination with the fuselage, of the upper wing having the central portion thereof cut out directly over and above the said fuselage, the opposing roots of said upper wing being shaped to form wing-tips, a wing-tip shield adjacent each of the opposed wing-tips and lying transversely of the wing to correct the undesirable aerodynamical influence of the discontinuity of the lifting surfaces of the wing, the section of the said lower wing being cut out immediately adjacent the said fuselage to provide an open space on each side of said fuselage, the opposing roots of said lower wing being shaped to form wing-tips, a wing-tip shield adjacent each of the opposed wing-tips and lying transversely of the wing to correct the undesirable aerodynamical influence of the discontinuity of the lifting surfaces of the wing.

3. In an airplane having upper and lower wings and a fuselage substantially intermediate said upper and lower wings, the combination with the fuselage, of the lower wing having a section of the same cut out immediately adjacent the said fuselage to provide an open space on each side of said fuselage, the opposing roots of said lower wing being shaped to form wing-tips, a wing-tip shield on the upper and lower surfaces of said lower wing adjacent each of the opposed wing-tips and lying transversely of the wing to correct the undesirable aerodynamical influence of the discontinuity of the lifting surfaces of the wing.

4. In an airplane having upper and lower wings and a fuselage substantially intermediate said upper and lower wings, the combination with the fuselage, of the lower wing having a section of the same cut out immediately adjacent the said fuselage to provide an open space on each side of said fuselage, the opposing roots of said lower wing being shaped to form wing-tips, a wing-tip shield adjacent each of the opposed wing-tips and lying transversely of the wing to correct the undesirable aerodynamical influence of the discontinuity of the lifting surfaces of the wing.

5. In an airplane, the combination with a fuselage of a wing having a section of the same cut out immediately adjacent the said fuselage to provide an open space on each side of the fuselage, the opposing roots of the wing adjacent the fuselage being shaped to form wing-tips, a wing-tip shield adjacent each of the opposed wing-tips upon the upper and lower surfaces of the wing and transversely thereof to correct the undesirable aerodynamical influence of the discontinuity of the lifting surfaces of the wing.

6. In an airplane, the combination with a fuselage of a wing having a section of the same cut out immediately adjacent the said fuselage to provide an open space on each side of the fuselage, the opposing roots of the wing adjacent the fuselage being shaped to form wing-tips, a wing-tip shield adjacent each of the opposed wing-tips, and lying transversely of the wing to correct the undesirable aerodynamical influence of the discontinuity of the lifting surfaces of the wing.

In testimony whereof we affix our signatures.

THOMAS CARROLL.
ELLIOTT G. REID.